United States Patent [19]
Lover

[11] 4,040,321

[45] Aug. 9, 1977

[54] ELECTROMAGNETIC PICKUP AND METHOD FOR TINE-TYPE ELECTRIC PIANO, AND PIANO INCORPORATING SUCH PICKUP

[75] Inventor: Seth E. Lover, Garden Grove, Calif.

[73] Assignee: CBS Inc., New York, N.Y.

[21] Appl. No.: 597,084

[22] Filed: July 18, 1975

[51] Int. Cl.$^2$ .......................... G10H 3/00; H04M 1/00

[52] U.S. Cl. .......................................... 84/1.15; 84/1.14; 179/1 B

[58] Field of Search ....................... 84/1.01, 1.14, 1.15, 84/1.16, 403, 405, 408, 409, 410, 456, 457; 179/1 M; 310/25-27

[56] References Cited

U.S. PATENT DOCUMENTS

| | | | |
|---|---|---|---|
| 2,510,094 | 6/1950 | Fleury | 84/1.15 |
| 2,581,963 | 1/1952 | Langloys | 84/403 |
| 3,270,608 | 9/1966 | Rhodes | 84/237 |
| 3,418,417 | 12/1968 | Rhodes | 84/1.15 |

FOREIGN PATENT DOCUMENTS

| | | | |
|---|---|---|---|
| 428,503 | 12/1947 | Italy | 84/1.15 |

*Primary Examiner*—E. S. Jackmon
*Attorney, Agent, or Firm*—Richard L. Gausewitz

[57] ABSTRACT

The present electromagnetic pickup and method, and the piano incorporating the pickup, make use of a protuberant magnetic pole piece portion which is so constructed and related that (a) the lines of magnetic force loop back therefrom, and (b) the concentration of such lines is sharply more dense on one side of such portion than on the other side thereof (the magnetic field adjacent such portion being therefore highly asymmetrical). The tine tip is caused to vibrate adjacent such portion, which produces in an associated coil a musical signal characterized by a high degree of brilliance and piano-like musicality — without an excess of the second harmonic. The pole piece portion is preferably offset from the axis of the coil. Preferably, there are two such offset portions, spaced on opposite sides of the coil axis, and each has a peak shaped as a substantial point or edge.

43 Claims, 14 Drawing Figures

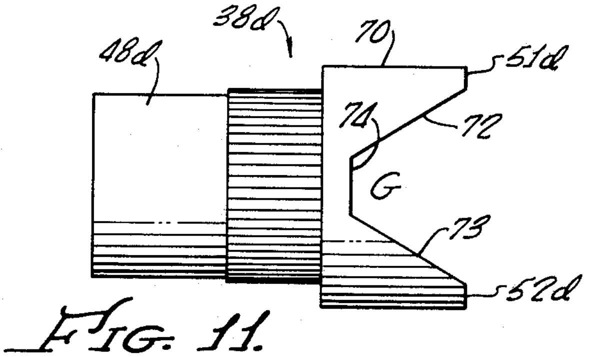
FIG. 11.
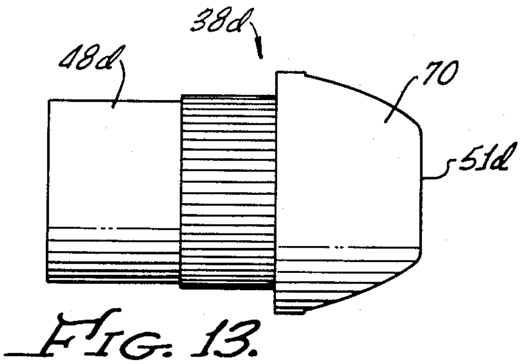
FIG. 13.
FIG. 14.
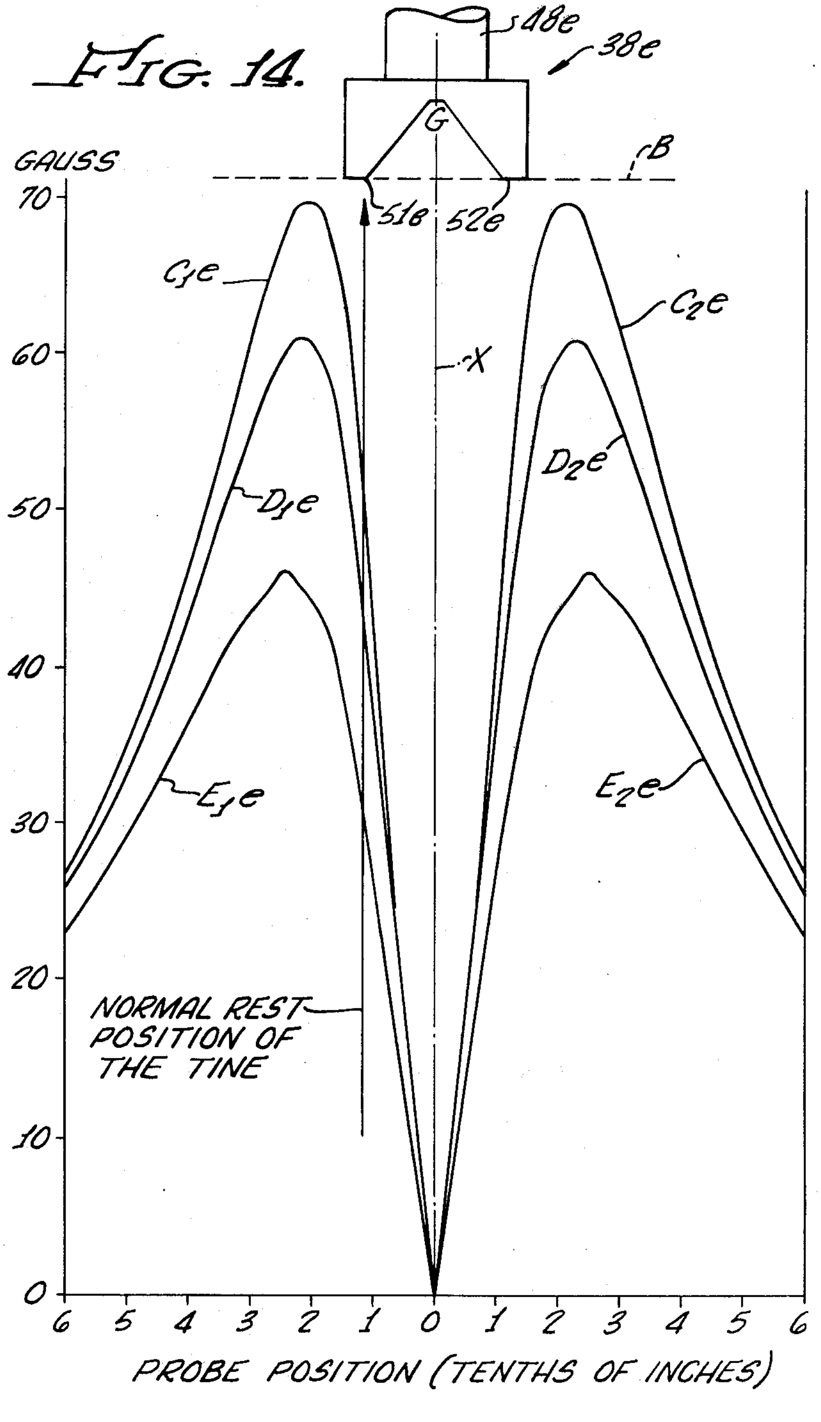
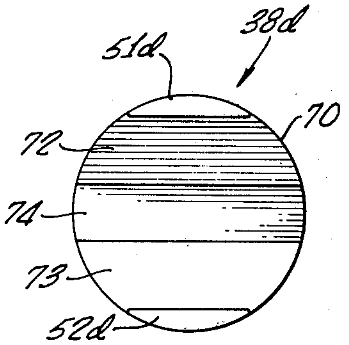
FIG. 12.

ELECTROMAGNETIC PICKUP AND METHOD FOR TINE-TYPE ELECTRIC PIANO, AND PIANO INCORPORATING SUCH PICKUP

BACKGROUND OF THE INVENTION

1. Field of the Invention:

This invention relates to the field of electric pianos incorporating electromagnetic mechanical-electrical transducers (commonly referred to as electromagnetic pickups).

2. Description of the Prior Art:

Because of their portability, their ability to remain in tune over long periods of time, their ability to be heard either by large numbers of people or (with earphones) only by the pianist himself, and their ability to generate numerous vibrato and tonal effects, electric pianos are becoming increasingly popular. Of electric pianos, the best are the electromechanical type in which the strings of conventional pianos are replaced by vibrating tines or reeds. The vibrations of the tines or reeds are sensed by pickups, thus generating voltage signals which are electronically amplified and fed to a loudspeaker.

A major problem relating to such electromechanical pianos resulted from the fact that vibrating tines or reeds normally have dissonant overtones which are not at all pleasing to the ear. These overtones are not harmonics (integral multiples of the fundamental frequency). In this respect, tines or reeds are to be contrasted with conventional piano strings, wherein the overtones are substantial harmonics and are pleasing to the ear.

The problem stated in the preceding paragraph, and other important problems, were solved as set forth in U.S. Pat. No. 2,972,922, inventor H. B. Rhodes. The invention stated in such patent, together with later Rhodes inventions as described (for example) in U.S. Pats. Nos. 3,384,699, 3,418,417, 3,644,656, produced a highly successful piano which is popular with large numbers of professional and other musicians.

There has, however, long existed a desire for an electromechanical tine-type piano which sounds more in the nature of a conventional string-type acoustic piano, particularly in the mid-range of the piano. To accomplish this, it is necessary not only to eliminate the dissonant reed overtones (as was done by Rhodes) but also to cause introduction at the pickup of harmonics having a different and more acoustic piano-like mix or character than in the prior art. The present invention does this economically, simply and practically, and also achieves excellent apparent loudness and brightness of tone, with consequent minimized requirements for amplification. The present invention also permits generation of tones and chords, even in octaves below middle C, which are relatively acoustic piano-like in character.

With relation to certain prior art other than the stated Rhodes inventions, U.S. Pat. No. 3,038,363, inventor B. F. Miessner, discusses theories relating to the creation of piano-like tones by means of an electromechanical reed-type piano. Harmonic content, and the generation of asymmetrical peaked voltage waves, are discussed at length. However, the electromagnetic pickup structures taught by U.S. Pat. No. 3,038,363 (FIGS. 49 through 54), and by other Miessner U.S. patents such as No. 3,215,765, are expensive, inefficient, large, and (it is believed) incapable of accomplishing important results achieved by the present pickup. Another prior-art U.S. patent, No. 2,581,963, inventor R. J. Langloys, shows in FIG. 22 an electromagnetic pickup of the general type used by Rhodes, and discusses a frequency-doubling effect which will be referred to later in this specification. Langloys also mentions that the shape of the pole piece extremity permits to grade the closing of the harmonics, but gives no indication of what shape o use or how or why to create any such grading. A further U.S. patent, No. 2,510,094, inventor E. O. Fleury, discloses an electromechanical piano of the type wherein the lines of magnetic force extend for the full length of the reed, and follow a substantially closed low-reluctance magnetic circuit, instead of looping back through the air around the coil. Fleury's object is to achieve sinusoidal variations of the magnetic flux, which variations (it is believed) produce dull tones very unlike those of an acoustic piano.

In summary, the prior art does not teach or suggest how to create, in a tine-type piano, acoustic piano-like sounds in a practical, economical, commercially feasible way — with excellent brightness and apparent loudness and with the ability to generate acoustic piano-like tones and chords both below and above middle C.

SUMMARY OF THE INVENTION

In the present apparatus and method, there is disposed adjacent a vibrating low-reluctance tine or reed a protuberant magnetic pole piece portion from which the lines of magnetic force (magnetic flux) loop back through the air in an asymmetrical manner — the concentration of the lines being sharply more dense on one side of such portion than on the other side thereof. There is thus generated in the associated sensing coil a voltage signal which, when amplified and fed to a loudspeaker, creates a bright, live sound simulative of an acoustic piano.

The tine in its rest (nonvibrating) position is preferably positioned opposite the protuberant portion, not spaced a substantial distance to one side thereof. Despite such positioning, the resulting voltage signal is not characterized by an excess of the second harmonic, having instead the desired pianistic harmonic mix. At the stated rest position of the tine, the magnetic field strength gradient is substantially the maximum, so that even a small change in tine position will cause the tine to shift from a region of one magnetic field strength to a region where the field strength is very different.

To summarize certain aspects of the invention in a somewhat different manner, the magnetic field is caused to be such that:

a. The rest position of the tine may be directly opposite the peak of the protuberence, yet vibration of the tine will not cause an excessive second harmonic.

b. There are two regions of relatively high magnetic field strength separated by a region of relatively low field strength, the two high-strength regions being spaced sufficiently far from each other that the tine may have its rest position at one of such high-strength regions and where there is substantially maximum magnetic field-strength gradient, yet (when vibrating at its normal amplitude) will spend a minimum (if any) amount of time at or near the other region of high field strength.

c. The tine may move a substantial distance from one side of the protuberance to the other side thereof, in a single direction, without at any time entering a region where the magnetic field-strength gradient reverses.

The protuberant magnetic pole piece portion is preferably a substantial point or edge, and is offset from the axis of the sensing coil. Preferably, two protuberant portions are provided, one on each side of the coil axis.

BRIEF DESCRIPTION OF THE DRAWINGS

FIg. 11 is a side elevational view of the form of pole piece which is preferred as of the time of filing of the present application;

FIG. 12 is a view of the face of such pole piece of FIG. 11, as seen from the right in FIG. 11;

FIG. 13 is a side elevational view of the pole piece of FIG. 11, as seen from above and at right angles to the showing of FIG. 11; and FIG. 14 is a set of curves corresponding to that of FIG. 7, but made with a pole piece substantially identical of that of FIGS. 11-13.

DETAILED DESCRIPTION OF THE PREFERRED EMBODIMENT

For information concerning the background and construction of the present piano, specific reference is hereby made to the above-cited U.S. patents Nos. 2,972,922; 3,384,699 (specifically, to FIGS. 14 and 15 of such patent); 3,418,417; and 3,644,656. Said patents are hereby incorporated by reference herein as though set forth in full.

The piano may have numbers of keys, for example, 73 or 88. The constructions of the tone generators, etc., change from key to key as indicated in the cited patents. In the present drawings, only one tone generator, and the associated hammer means, key, etc., are shown. The illustrated tone generator is one adapted to generate a tone in the midrange of the piano, this being where the present invention has its greatest importance. The "midrange" is hereby defined to extend from the C one octave below middle C (having a vibrational frequency about 130 Hz.) to the C two octaves above middle C (about 1046 Hz.).

Figures 1, 3:
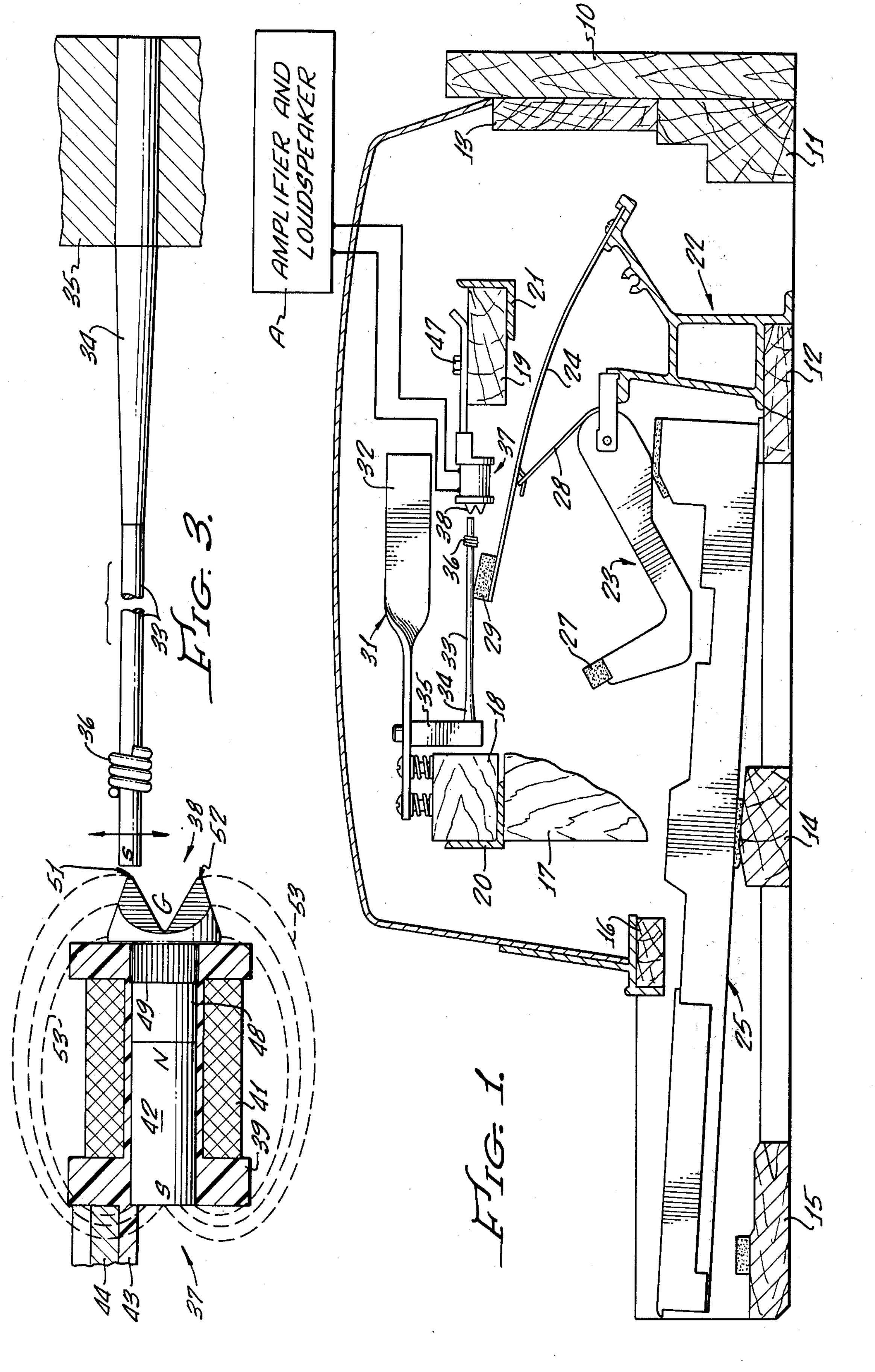
FIG. 1 is a transverse sectional view of a piano incorporating the present electromagnetic pickup, showing the various components associated with each key of the piano.
FIG. 3 is a view, partially in side elevation and partially in vertical section, showing the preferred relationship between the pickup assembly and an associated tine of the piano.

Referring to FIG. 1, the piano incorporates numerous elongated support elements, including wooden members 10 through 19, inclusive. Two of such members, numbers 18 and 19, are respectively associated with metal angle bars 20 and 21 in order to increase the rigidity thereof. The support means incorporated in the piano further comprises an extrusion 22 which is mounted on wooden member 12 and supports the hammers and dampers of the piano action.

Each piano action comprises a hammer 23, damper spring 24, and key 25, the latter being pivotally mounted on support 14. The illustrated piano action is of the type described in U.S. Pat. No. 3,270,608, inventor H. B. Rhodes, which patent is hereby incorporated by reference herein as though set forth in full. It is to be understood, however, that numerous other types of piano actions may be employed, although with less satisfaction and with greater cost.

The preferred piano action includes a solid rubber tip 27 on the hammer, and which is adapted to strike the tone generator as described below. The preferred action is also one wherein each spring 24 is integrally connected at its base to a number of adjacent springs (for other piano actions) in modular relationship. Each damper spring 24 is associated with hammer 23 by a strap 28, so that when the outer (left) end of key 25 is depressed by the finger of the pianist, causing the hammer 23 to pivot upwardly, the damper spring 24 will be pulled down. This causes a felt pad 29 at the end of spring 24 to move away from the tone generator, so that vibrations may continue. A suitable sustaining pedal, not shown, is incorporated in the instrument.

The hardness of the tips 27 varies from key to key, the tips being softest in the bass regions of the piano and hardest in the highest-pitched regions. The place where the tip 27 strikes the tone generator is adjusted in such manner as to maximize the relationship whereby the tone generator will vibrate substantially entirely in its fundamental mode.

The tone generator is indicated generally at 31, being of the type described in U.S. Pats. Nos. 2,972.922 and 3,644,656. It is mounted to support 18 in the general manner described relative to FIGS. 14 and 15 of U.S. Pat. No. 3,384,699.

As described in the cited patents, the tone generator 31 is an asymmetrical tuning fork, having a high-mass leg (or tone bar) 32 and a low-mass leg (or tine) 33. Tine 33 is composed of hard steel, and is formed by rotary swaging as set forth in U.S. patent application Ser. No. 179,763, now abandoned, which is hereby incorporated by reference as though set forth in full (said application Ser. No. 179,763 also describes the hammer tips in detail). The base region (left in FIG. 1) of the tine 33 is enlarged at 34 and very rigidly associated with a bar 35 which is in turn rigidly associated with tone bar 32. A spring 36 is slidably mounted at the end region of tine 33 in order to permit tuning thereof, as generally described in U.S. Pat. No. 2,972,922.

Tine 33 thus has one end portion 34 which is fixed, and another end portion (the distal end portion) which is free to vibrate. The steel tine may be referred to as having a low reluctance, since it is much more magnetically permeable than (for example) air or various nonferrous metals.

As soon as it is struck by the rubber tip 27 of hammer 23, the tine begins to vibrate in the vertical plane. The normal amplitude of vibration (measured from the rest position to one extreme position) of the tine tip ranges (with typical striking force on the key) from a substantial fraction of an inch in the extreme bass regions of an 88-key piano to a minute fraction of an inch in the highest-pitched regions thereof. At the lower end of the above-defined midrange of the piano, namely one octave below middle C, the normal amplitude of steady-state vibration of the tip of tine 23 is (with typical striking force on the key 25) about one eighth inch (measured a short time after striking, after termination of the initial percussive action). At the upper end of such midrange, two octaves above middle C, such normal amplitude of steady-state vibration is about 1/64 inch.

Because of the tuning-fork relationship between elements 32 and 33, and because the tone generator 31 is only loosely associated with the wooden support 18, the tine 33 (although cylindrical instead of flat) continues to vibrate in the vertical plane instead of orbiting.

At the instant of striking of tine 33 by the hammer tip 27, such tine vibrates not only in its fundamental mode but also (particularly in the middle and lower regions of the piano) with dissonant overtones. However, because of the tuning-fork relationship between elements 32–33, which are in substantial resonance with each other, and because of other factors described in the cited patents, the overtones very quickly disappear so that the tine 33 continues to vibrate substantially entirely in its fundamental mode. The undesired overtones having thus been removed, it is of great importance that desired overtones, namely harmonics in the right proportion and the right amounts for the desired acoustic piano-like sound, be introduced by the pickup means and method described below.

GENERAL DESCRIPTION OF THE PICKUP MEANS

Figure 2:
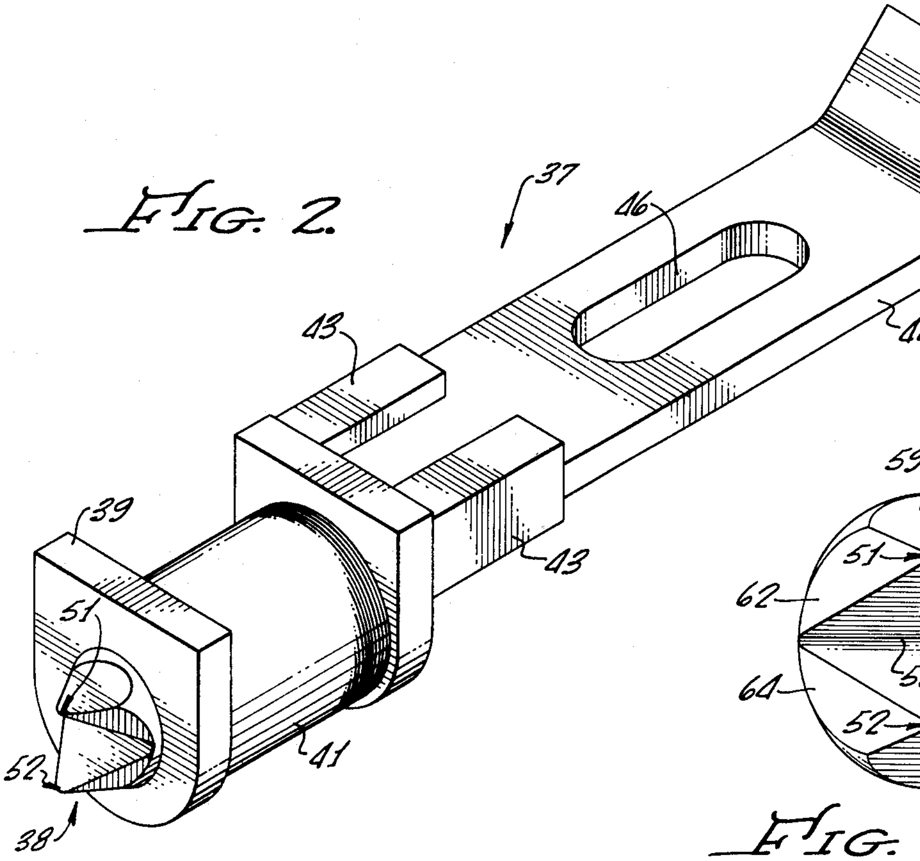
FIG. 2 is an enlarged isometric view of the pickup assembly.

The pickup assembly is designated generally by the reference numeral 37, and comprises a headed pole piece 38 the shank portion of which is introduced into a bobbin 39, there being a large number of turns of fine wire around the bobbin 39 to thus form a coil 41. Mounted in axial alignment with the shank of pole piece 38 in the bobbin is a longitudinally-polarized elongated permanent magnet 42 (FIG. 3). Bobbin 39 has a base or support portion 43 which is shaped as a recess into which is introduced the distal end of a nonmagnetic support arm 44. Arm 44 extends away from the pole piece 38, and rests on the upper surface of wooden support 19 (FIG. 1), there being a slot 46 (FIG. 2) in arm 44 to receive a mounting screw 47 (FIG. 1). Loosening of screw 47 permits the entire pickup assembly 37 to be adjusted toward and away from the tip of tine 33. The pickup is thus suitably mounted, independently of the tine, so that adjustments can be made relative to pickup position.

The bobbin 39 is preferably made of plastic. Accordingly, and since the support arm 44 is made of aluminum or other nonmagnetic substance, the only magnetic or magnetizable substances in the pickup assembly 37 are permanent magnet 42 and the pole piece 38. Pole piece 38 is made of some substance, such as mild steel, having a low reluctance (high magnetic permeability).

The magnet 42 and pole piece 38 comprise a magnetic means to create a steady-state magnetic field. By "steady-state" it is meant that the generated field is stationary, namely fixed in space. The coil 48 constitutes a means, responsive to such magnetic means and to vibration of the low reluctance tine in the generated magnetic field, to create an electrical signal. Such signal is fed to an amplifier and loudspeaker indicated at A in FIG. 1.

The strength of permanent magnet 42 is not particularly great, being sufficiently low that there will not be created an excessive magnetic drag on the vibrating tine 33. If the magnetic strength were great, there would be strong force tending to cause the tine 33 to cease vibrating, this being undesirable in many of the pitch regions of the electric piano.

Pole piece 38 has a shank 48 which is preferably cylindrical and coaxial with the coil 41, a portion of such shank 48 being knurled at 49 whereby to lock the shank in the plastic bobbin 39 when the pole piece is press-fit therein. The inner end of the shank fits closely adjacent and engages one end of the permanent magnet 42.

DESCRIPTION OF THE POLE PIECE HEAD, AND OF THE METHOD

In accordance with one aspect of the present apparatus and method, there is provided a protuberance (protuberant portion) 51 from which the lines of magnetic force (magnetic flux) loop back, for example as shown in FIG. 3, and so related that the magnetic field on opposite sides of such protuberance is highly asymmetrical. The tine, preferably the tip of the tine, is then caused to vibrate in such asymmetrical magnetic field — moving rapidly between positions at which the magnetic field strengths are drastically different. Preferably, the tine tip moves back and forth between opposite sides of the apex or peak of the protuberance 51, as indicated by the two-headed arrow in FIG. 3. The tine tip is caused to pass relatively close to such peak, preferably as close as is permitted by reasonable manufacturing tolerances. (The peak of the protuberance 51, and of protuberance 52 described below, is that portion closest to the tine. In the present drawings, the lead lines for the numbers 51, 52, etc., extend to such peak.)

The result of the described tine movement, and of the described asymmetrical field, is the generation in coil 41 of a voltage signal which has the desired harmonic mix for achieving bright and acoustic piano-like sounds. Such sounds result from the transmission of the indicated voltage signal to the amplifier-loudspeaker A shown in FIG. 1. The sounds have excellent apparent loudness, thus minimizing the amount of amplification which is required.

There is generated or induced in the tip of tine 33 a magnetic pole the polarity of which is the opposite of that at the protuberance. For example, in the apparatus illustrated in FIG. 3 there is generated in such tip a south pole S since the north pole N of magnet 42 is adjacent the pole piece 38. Thus, some of the flux which emanates from protuberance 51 is present in the tine tip. It is emphasized, however, that no substantial part of the magnetic flux passes along the full length of tine 33, the flux instead looping upwardly and back through the air, and through substances which are desirably (for various reasons, including economy) nonmagnetic, generally as shown by the upper dashed lines 53 in FIG. 3.

The peak of the protuberance 51 is offset (spaced) from the extended axis of coil 41, which axis is preferably coincident with that of magnet 42 and shank 48. Furthermore, such peak is a substantial point or a short edge in order that flux concentration will be substantially maximized. By employing an edge instead of a point, as described below relative to FIGS. 10 and 11–13, manufacturing is facilitated in that it is then not necessary to line up with a point the plane of tine vibration. Whether it is a short edge or point, the peak should be relatively sharp, that is to say should have a relatively small dimension in the direction of tine vibration.

To provide a high degree of asymmetry in the generated magnetic field, and for other reasons, the present apparatus and method preferably employ a second protuberance 52 the peak of which is spaced from the first-mentioned protuberance and is on the opposite side of the extended axis of coil 41. Thus, the head of the pole piece 38 is provided with a central groove or valley G (FIG. 3) defined between the two protuberances 51–52.

Because, in the preferred form, there are two protuberances 51–52 the peaks of which are spaced apart, the lines of flux extending axially from permanent magnet 42 tend to divide at the groove or valley G. Some of such lines pass generally upwardly (FIG. 3) through protuberance 51 and then loop back above coil 41 as illustrated (the upper dashed lines 53). Others of such lines pass generally downwardly through protuberance 52 and then loop back below the coil 41 (the lower dashed lines 53).

Since the mild steel forming pole piece 38 has a reluctance lower than that of air, and since the lines of magnetic flux tend to follow relatively low-reluctance paths and also relatively short paths, there are only a few lines in the valley or groove G between the protuberances. Therefore, with respect to each individual protuberance, the magnetic field in the adjacent regions of the air is highly asymmetrical.

Figure 7:
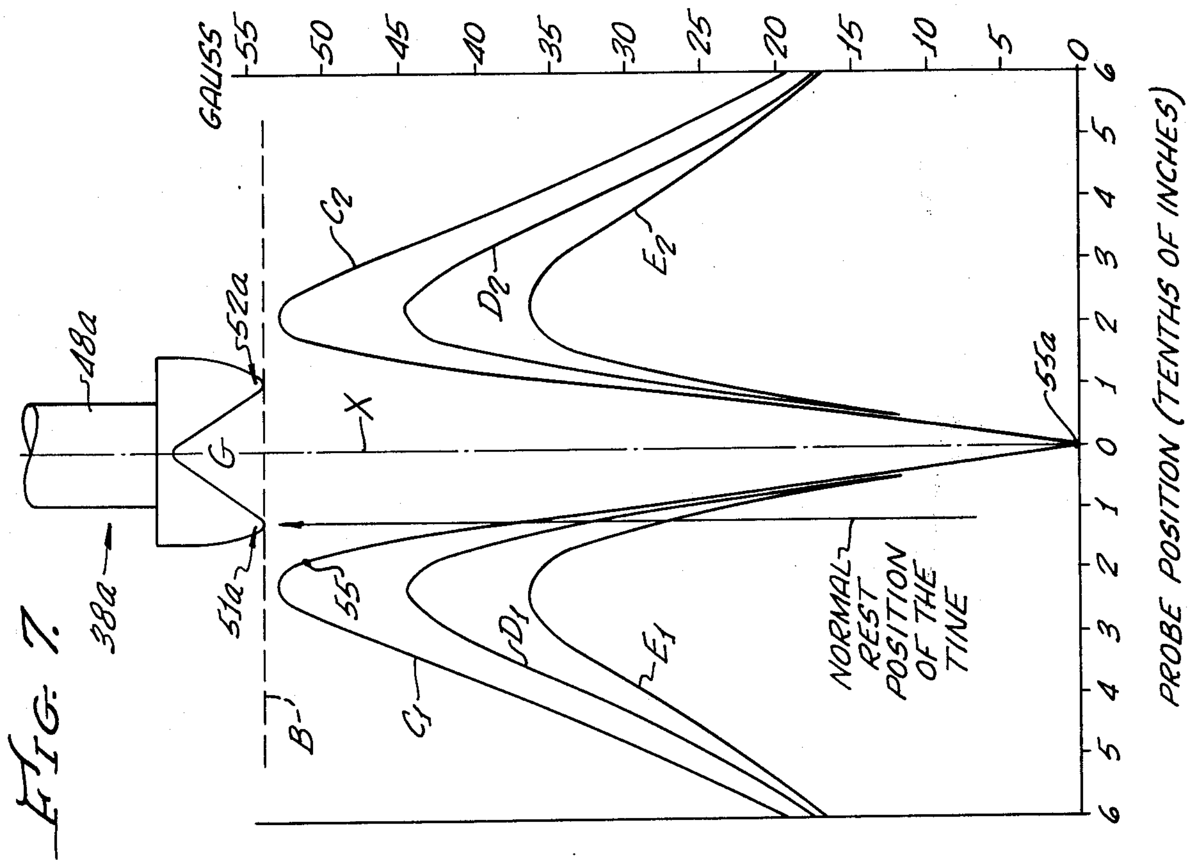
FIG. 7 is a set of curves showing magnetic field strength in regions adjacent the present pole piece.

Referring next to FIG. 7, this comprises a set of upwardly-convex curves representing the magnetic field strengths at different distances from the peaks of the protuberances, and at different distances from the axis X of the present pole piece. A hypothetical base line, indicated at B in FIG. 7, passes through the extreme peaks of the indicated pole piece 38*a* (the suffix *a* being used in FIG. 7 because the illustrated pole piece has an outline shape somewhat different than that shown in FIG. 4). Curves $C_1$ and $C_2$ are generated by moving the probe of a magnetometer along a line parallel to line B but spaced therefrom (in a direction away from coil 41) a distance of 0.020 inch. Similarly, curves $D_1$ and $D_2$, and $E_1$and $E_2$, are generated by moving the probe along lines spaced, respectively, 0.040 inch and 0.060 inch from the base line B.

Figure 8:
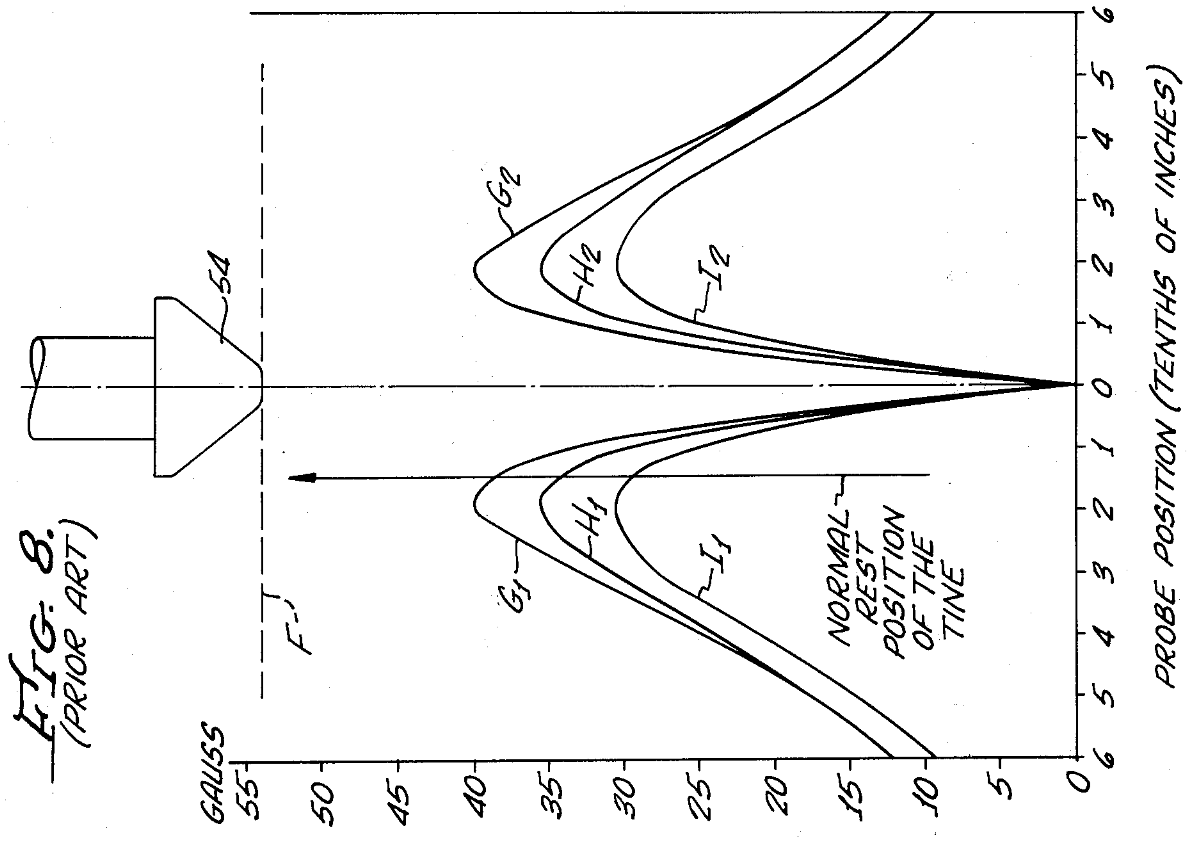
FIG. 8. (PRIOR ART)
FIg. 8 is a set of curves showing the field strength adjacent a prior-art pole piece.

The curves of FIG. 8 were generated in the exact same manner as those of FIG. 7, except that a prior-art pole piece 54 was employed in place of one constructed in accordance with the present invention. Such pole piece is one which has been sold for years by the assignee of the present application, having a single central peak (an edge). Thus, the same magnet, magnetometer, coil, etc., were used in generating the curves of FIG. 8 as those of FIG. 7.

In FIG. 8, the hypothetical base line is shown at F. The curves resulting from movement of the magnometer probe along a line parallel to line F and spaced 0.020 inch therefrom (spaced away from the coil) are designated $G_1$ and $G_2$. Similarly, those resulting from probe movement along lines spaced 0.040 inch and 0.060 inch from base line F are designated $H_1$ and $H_2$, and $I_1$ and $I_2$.

The pole pieces 38*a* and 54 of FIGS. 7 and 8, respectively, are drawn approximately to the same scale as that stated at the bottoms of the graphs. Furthermore, the locations of pole pieces 38 and 54 as shown on the respective graphs.

FIG. 7 shows clearly the high degree of asymmetry of the magnetic field with respect to protuberance 51*a.* Thus, for example, the field strength 0.1 inch to the left of the peak of protuberance 51*a* approaches maximum, whereas that 0.1 inch to the right of such peak approaches zero. The magnetic gradient (rate of change, with distance, of magnetic field strength) is very steep on both sides of the peak of protuberance 51*a.*

Very importantly, the gradient in FIG. 7 does not reverse for substantial distances on opposite sides of the peak of 51*a.* Instead of reversing, the gradient continues in a very steep downward direction from a point 55 (with relation, for example, to curve $C_1$) at the left of the peak of 51*a* to a point 55*a* at the right of such peak. Stated otherwise, the gradient is steep and unidirectional from one side of the peak to the other side thereof.

Referring next to FIG. 8, showing the prior art, the field is not at all asymmetrical with respect to the peak of the pole piece 54, but is instead symmetrical. Thus, in each of the corresponding curves $G_1$-$G_2$, etc., the field strength is the same at equal distances on opposite sides of the peak of the pole piece. Very importantly, the magnetic gradient reverses at the peak. Moving in a direction from left to right, the field strength diminishes until the peak of the pole piece is reached, then increases (reverses) for a substantial distance to the right of the peak.

Because of the relationships illustrated in FIG. 8, showing the prior art, movement of the tine tip in a single direction (for example, from left to right) from one side of the peak to the other side thereof causes a reversal of th polarity of the voltage generated in the associated coil. Assuming, for example, that the tine tip is initially 0.1 inch to the left of the pole-piece peak in FIG. 8, rightward movement of such tip will cause a voltage change (in the associated coil) in one direction. As soon as the center of the peak is reached, and because of the reversal in magnetic gradient at the peak in FIG. 8, continued rightward movement will cause a voltage change in the opposite direction. This creates doubling of the frequency of the generated voltage wave, which raises the pitch by one octave. Such pitch-doubling effect (namely, creation of a highly dominant second harmonic) has long plagued the prior art, being mentioned in the above-cited Langloys patent.

Conversely, and with reference to FIG. 7, movement of the tine tip in the present piano in a single direction (for example, from left to right) from one side of the peak of protuberance 51*a* to the other side thereof does not result in frequency doubling (creation of a dominant second harmonic). For example, movement of the tip from a point 0.1 inch to the left of the peak to a point 0.1 inch to the right thereof does not cause the tip to pass through any region where the direction of the magnetic gradient reverses. Therefore, such single-direction movement does not cause reversal of the direction of change of the voltage generated in coil 41, and thus does not cause frequency doubling.

FURTHER DESCRIPTION OF THE POLE-PIECE HEAD AND OF THE METHOD WITH PARTICULAR REFERENCE TO THE REST POSITION OF THE TINE, TO THE AMPLITUDE OF VIBRATION, AND TO SPACINGS

To avoid frequency doubling, or an excess of the second harmonic, in the prior-art piano containing pole piece 54 shown in FIG. 8, it is conventional to cause the rest (nonvibrating) position of the tine to be at the vertical arrow in such figure. (The tine movement in FIG. 8 is horizontal, namely rightward and leftward in such figure.) However, such a location of the rest position is on relatively flat (less steep) portions of curves $G_1$, $H_1$ and $I_1$. Thus, when the tine vibrates equal distances on opposite sides of the vertical arrow in FIG. 8, it spends much of its time on less steep regions of the curves. The harmonic content of the generated voltage wave is largely dependent upon the steepness of the magnetic gradient through which the tine vibrates, there being more of the higher harmonics when the gradient is very steep and less when it is not. If follows that in the prior art relationship depicted by FIG. 8, the attempt to avoid an excessive second harmonic (frequency doubling), by moving the rest position away from the peak of the protuberance of pole piece 54, results in a decrease in higher harmonics and thus in the brightness of the tone. The tone, particularly in the important midrange of the piano, is less like that of an acoustic piano than is the tone produced by the presently-described instrument.

Referring to FIG. 7, where the normal rest position is again represented by a vertical arrow, it is emphasized that such rest position is opposite the peak or apex of protuberance 51*a.* (As in FIG. 8, the tine vibrates horizontally, that is to say rightwardly and leftwardly.) It is also emphasized that, for major distances on both sides of such normal rest position, the curves $C_1$, $D_1$ and $E_1$ are very steep. The present instrument therefore creates rich, bright, acoustic piano-like sounds not characterized by an undesired amount of the second harmonic.

It is to be understood that the rest position of the tine of the present instrument may vary somewhat, in accordance with production tolerances, or in order to adjust the harmonic mix. Thus, for example, the rest position may be a short distance to the left of that shown in FIG. 7. With the spacing (between the peaks of 51*a* and 52*a*) shown in FIG. 7, and with the described cylindrical tines, it is generally undesirable (particularly in the lower portions of the midrange of the piano) that the rest position be substantially to the right of the one shown. This is because the vibrating tine tips at the lower portions of the midrange would then be present too much of the time at curves $C_2$, $D_2$ and $E_2$, with consequent excessive second harmonic.

To summarize the above, therefore, the rest position of the tine should be on a steep part of the magnetic field-strength curve, preferably at about the center of the steepest curve part. Furthermore, the curve is so shaped that the tine can have the indicated rest position and still not generate an excessive second harmonic when set into vibration at a substantial amplitude. With the present pole piece and method, the rest position can be directly opposite the peak of 51*a,* and the tine tip can vibrate substantial distances to opposite sides of such peak, without generating an excessive second harmonic.

Again referring to the spacing between the peaks of 51*a* and 52*a,* this is in large part determined by the normal or typical amplitude of vibration of the tine tip in the piano range of maximum interest. As noted above, the normal steady-state amplitude of vibration of the tine tip one octave below middle C is about one-eighth inch. In FIG. 7, the normal rest position is shown as being nearly one-eighth inch from the axis X of the pole piece 38*a.* Thus, the tine would typically vibrate (one octave below middle C) toward the right until the vicinity of axis X is reached, then reverse direction and move leftward until about the upper (inflection) regions of curves $C_1$, $D_1$ and $E_1$ are reached, then again reverse direction and return to the illustrated rest position.

The distance between the peaks of the protuberances 51*a*–52*a,* FIG. 7, is somewhat over one-fifth inch, this being a desirable spacing in a piano containing the tines 33 described in the present application and in the cited Rhodes patents and patent application.

For notes pitched higher than one octave below middle C, the typical or normal excursion of the vibrating tine tip is smaller, so that (when in normal steady-state vibration, after the initial percussive excursion) it normally does not reach either the axis X or the inflection regions of curves $C_1$–$E_1$.

For notes pitched progressively lower than one octave below middle C, the tines are progressively longer and, therefore, the typical amplitudes of vibration are progressively greater. Thus, the tine tip then intrudes more and more (at progressively lower-pitched notes) on the magnetic field regions represented by curves $C_2$–$E_2$.

It is within the scope of the invention to change the indicated spacing between the peaks of protuberances 51*a* and 52*a,* for example by increasing such distance in the low bass regions. There would than be greater spacing between curve group $C_1$–$E_1$ and curve group $C_2$–$E_2$, with resulting lessened generation of the second harmonic. Stated otherwise, the peaks of the protuberances are so related to each other that the rest position of the tine tip can be at one of two opposed magnetic gradient slopes (for example, the opposed and relatively adjacent slopes of curves $C_1$ and $C_2$), yet when the tip is vibrating with a normal or typical amplitude it will spend little if any time on the upper parts of the other slope. The words "upper parts" are used since, as shown in FIG. 7, the field of strength is so low near axis X that some intrusion of the vibrating tine tip on the far side of the axis X (from the rest position) is not serious.

Another spacing which is of importance is the distance from the tip of a non-vibrating tine to base line B (FIG. 7), such distance being the shortest distance (measured perpendicularly to line B). If such distance were great, for example an inch, the benefits of the present invention would be lost since from such a distance it would be difficult or impossible for the tine to sense whether or not there is a valley G in the pole piece. At the other extreme, the spacing cannot be so small that actual touching of the tine to the pole piece could occur, or that manufacturing difficulties and costs become excessive. The indicated spacing should be less than about one-eighth inch. A preferred spacing is about 0.030 inch, which is intermediate the two curves $C_1$ and $D_1$. This is sufficiently close to the peak of protuberance 31a to create bright, live sounds, but far enough therefrom to maintain manufacturing simplicities and economies.

Another important spacing is the distance from the bottom of groove or valley G to the peaks of the protuberances. If the valley were extremely shallow the benefits would be largely lost. On the other hand, extreme deepness is unnecessary and may increase manufacturing costs. A desirable depth of the groove or valley is approximately one-eighth inch (measured perpendicularly to line B).

It is possible, although usually undesirable, to eliminate entirely (or truncate) the protuberance 52*a* (for example, as described below relative to FIG. 9). Elimination or truncation of protuberance 52*a* may be effected, for example, in the low bass regions. When peak 52*a* is thus reduced or eliminated, the remaining peak of protuberance 51*a* is still offset a substantial distance from the axis of the pole piece and of the associated coil. Because of such offsetting, the field on opposite sides of the peak is asymmetrical — primarily because of the tendency of the looping-back flux lines to follow relatively short paths to the opposite end of the pickup.

It is also possible, although again undesirable, to cause the axis of the tine to be at a right angle (or some other angle) to that of the pole piece. This may be imagined, for example, by referring to FIG. 7 and pretending that the lower end of the arrow is pivoted upwardly from the paper (about a hypothetical pivot axis at the arrow head) until the arrow is at a right angle (perpendicular) to the paper. A single pickup coil may then be used for two adjacent tines, there being a grooved pole piece at each end of the coil.

The present pickup and method are best employed with cylindrical steel tines 33 the free ends of which are small in diameter, and which have substantial amplitudes of vibration in the midrange (and low bass range) of the piano. A particularly desirable diameter of the free ends of the tines is 0.060 inch. The use of flat reeds, particularly those which are stiff and weighted, is much less desirable for numerous reasons described in the cited Rhodes patents and also because the generated sounds are relatively dull in comparison to those generated by the present small-diameter cylindrical steel tines. It is to be understood, however, that improvements result from the present invention even when the undesired flat reeds are employed.

SPECIFIC EXAMPLES

The grooved pole piece of the present invention may be made by cold-heading a mild steel (such as S.A.E. 1010 mild steel) cylinder, by powder metallurgy, or in other ways.

Figure 6:
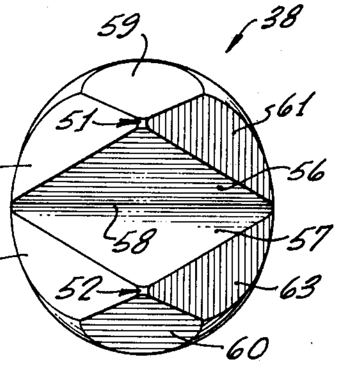
FIG. 6 is an end elevational view of the face of the pole piece.
Figure 4:
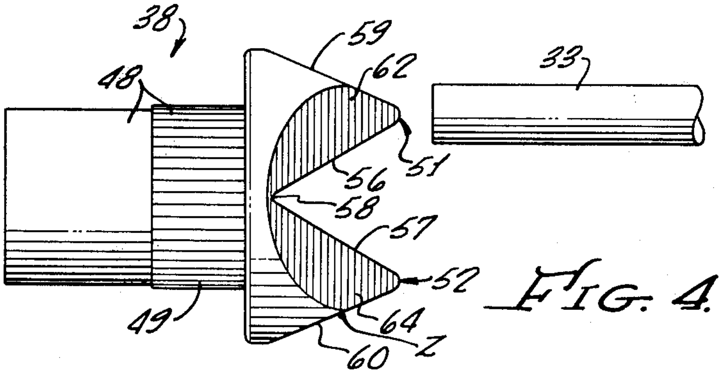
FIG. 4 is an enlarged side elevational view showing the pole piece and the adjacent tine tip.
Figure 5:
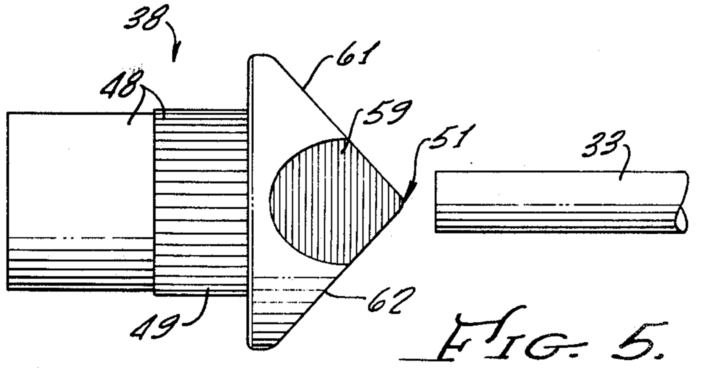
FIG. 5 is a top plan view of the showing of FIG. 4.

Referring particularly to FIGS. 4–6, the illustrated pole piece 38 has a bifurcated head the inner faces 56 and 57 of which converge toward each other (and toward the shank 48 of the pole piece) and intersect at a line 58 which is perpendicular to and intersects the axis of the pole piece 48 (which is preferably the same as the axis of coil 41 and of magnet 42). In the illustrated apparatus wherein the tine 33 is horizontal, the line 58 is also horizontal, being perpendicular to a vertical plane containing the tine 33.

The head of pole piece 38 also has upper and lower surfaces 59 and 60 which diverge away from the respective surfaces 56 and 57, substantially intersecting the latter surfaces near the peaks or apexes.

There are also four side surfaces 61–64, the surface 61 converging toward surface 62 and substantially meeting it at the peak. Correspondingly, surface 63 converges toward surface 64 and substantially meets it at the peak.

It will thus be seen that the four surfaces 59, 61, 56 and 62 converge toward a substantial point forming the peak of the first protuberance 51. Furthermore, the surfaces 57, 63, 60 and 64 converge toward each other and meet at the peak of the second protuberance 52.

The remainder of the pole piece head, not including the described surfaces, is substantially circular as best shown in FIG. 6. The diameter of the base region of the head is much larger than that of the shank 48.

The permanent magnet 42 is made of Alnico 5, magnetized lengthwise. It is a cylinder 0.5 inch long and 0.1875 inch in diameter.

Figure 9:
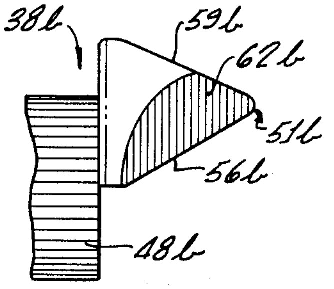
FIG. 9 is a view corresponding to FIG. 4, but showing a pole piece wherein the second protuberance has been cut off.

Referring next to FIG. 9, an illustrative single-protuberance pole piece **38*b* is shown. Pole piece 38*b* may be made by cutting pole piece 38 (FIG. 4) in an axial plane containing line 58, and then cutting radially to remove all of protuberance 52 and its base. The reference numbers in FIG. 9 correspond to those in FIG. 4** except that the letter *b* is added in each instance.

Instead of completely removing protuberance 52 and its base, as described in the preceding paragraph, such protuberance may be truncated. For example, the peak portion may be cut off by making a cut at point Z shown in FIG. 4. Such cut extends completely through the protuberance 52 (but not through any part of protuberance 51), being in a plane perpendicular to the axis of shank 48, or being somewhat rounded or otherwise shaped.

Figure 10:
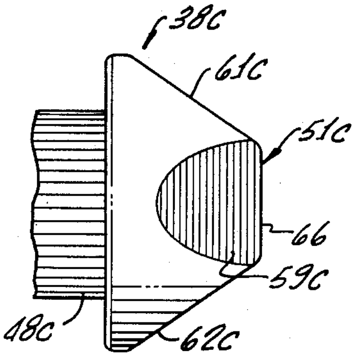
FIG. 10 is a view corresponding to FIG. 5, but showing one type of pole piece wherein each peak is a short edge instead of a substantial point.

FIG. 10 shows a short edge 66 which is preferably employed in order to facilitate manufacturing as stated above. Such short edge 66 may be incorporated, for example, in the embodiment of FIG. 9 or in that of FIGS. 4–6. The illustrative pole piece **38*c* of FIG. 10 corresponds exactly to that of FIGS. 4–6 (or, in the single-protuberance form, to that of FIG. 9) except that the peak is the short edge 66 instead of a substantial point. To maintain the desired depth of the valley between the peaks, the surfaces 61*c* and 62*c* are more steep than are the surfaces 61 and 62 of FIG. 5. The numbers in FIG. 10 correspond to those in FIG. 5**, except that the letter *c* is added in each instance. A side view of the form of FIG. 10 would be substantially identical to FIG. 4.

The tine positions relative to FIGS. 9 and 10 are the same as those previously described. Relative to FIG. 10, an attempt is made to locate the tine tip opposite the center of edge 66, but production tolerances cause some variations.

Referring next to FIGS. 11–13, these relate to the specific form of pole piece which is preferred as of the time of filing of the present application. Except as specifically stated, all components of the piano apparatus are identical to what was described relative to previous embodiments.

The pole piece is indicated at **38*d*. The head of such piece has a cylindrical outer surface 70 which is coaxial with the axis of shank 48*d***, and which has a diameter somewhat larger than that of such shank.

The groove G in the embodiment of FIGS. 11–13 may be milled in the cylindrical head of pole piece **38*d* to form the interior sloping side surfaces 72 and 73 and also a groove bottom 74, the latter being in a plane perpendicular to the axis of the pole piece. The width of the milled groove, at the region remote from shank 48*d*, is sufficiently great that the peaks 51*d* and 52*d* are relatively narrow (in the direction of tine movement), it being noted that the tine position (when at rest) is as indicated by the vertical arrow in FIG. 14 and that the tip of the tine (represented by the point at the upper end of the vertical arrow in FIG. 14) moves to the right and left in FIG. 14** as the tine vibrates.

Relative to the specific dimensions of pole piece **38*d*, the diameter of shank 48*d* may be 0.197 inch, the overall length of the pole piece 38*d* may be 0.40 inch, the length of the head 0.150 inch, the head diameter 0.25 inch, the width of the milled groove at its widest point (remote from the shank 48*d*) 0.20 inch, the distance (measured axially of the pole piece) between groove bottom 74 and the shoulder (where the shank meets the head) 0.03 inch, and the included angle between the surfaces 72–73** 60°.

Referring next to FIG. 14, this shows a set of curves which correspond to the curves described above relative to FIG. 7, except that a pole piece **38*e* is employed instead of the pole piece 38*a* of FIG. 7. Pole piece 38*e* is highly similar or identical to the one described relative to FIGS. 11–13, having a cylindrical exterior side surface, etc. The normal position of the tine when at rest is (as above stated) depicted by the vertical arrow in FIG. 14.**

The curves $C_1e$, $D_1e$, $E_1e$, $C_2e$, $D_2e$, $E_2e$ in FIG. 14 correspond, respectively, to the curves $C_1$, $D_1$, $E_1$ and $C_2$, $D_2$, $E_2$ in FIG. 7, except that the pole piece **38*e* is employed as distinguished from the pole piece 38*a*, and except that the lower curves $E_1e$ represent a spacing (from base line B) of 0.080 inch instead of 0.060 inch (the upper two sets of curves in FIG. 14** represent spacings from line B of 0.020 inch and 0.040 inch, respectively).

Referring to FIG. 13, it is noted that peak **51*d* is relatively wide, instead of pointed, so that it is unnecessary to effect precise centering of the tine in production. In this regard, the embodiment corresponds generally to that of FIG. 10.**

The above specific examples are given by way of illustration only, not limitation.

The axis of each protuberance 51, 52, etc., is hereby defined to be a line parallel to the axis of shank 48, such line extending through the center of the peak of such protuberance.

The foregoing detailed description is to be clearly understood as given by way of illustration and example only, the spirit and scope of this invention being limited solely by the appended claims.

I claim:

1. A tine-type electromechanical musical instrument, which comprises:

a. a tine or reed one end portion of which is fixed and the remaining portion of which is free to vibrate in a predetermined direction, b. magnetic means including a protuberance to generate in the air in the region of said protuberance a magnetic field which is asymmetrical with respect to said protuberance, said means being such that the lines of force in said magnetic field loop back instead of following a substantially closed low reluctance magnetic circuit including a tine or reed, said means causing said asymmetry of said magnetic field to be such that the magnetic field strength along a hypothetical straight line which extends through the air past said protuberance is relatively high adjacent one side of said protuberance and relatively low adjacent the other side thereof, c. means to mount said magnetic means in such relationship to said tine that said hypothetical line is parallel to said predetermined direction of vibration, and also in such relationship to said tine that a part of said free tine portion is disposed in said magnetic field, d. means to set said free tine portion into vibration in said predetermined direction, and e. means associated with said magnetic means to generate an electrical signal in response to said vibration of said part in said field.

2. The invention as claimed in claim 1, in which said magnetic means is such that said magnetic field is stationary, and in which said mounting means of clause (c) is independent of said tine.

3. The invention as claimed in claim 2, in which said magnetic means comprises a permanent magnet and a low reluctance pole piece disposed adjacent said magnet, said pole piece having said protuberance formed thereon, and in which said means recited in clause (e) is a coil of wire.

4. The invention as claimed in claim 3, in which the axis of said coil of wire is offset a substantial distance from said protuberance.

5. The invention as claimed in claim 1, in which said means recited in clause (d) comprises a piano action, and in which amplifier and loudspeaker means are connected to said means recited in clause (e).

6. The invention as claimed in claim 1, in which said tine part recited in clause (c) is formed of a material having a low reluctance.

7. The invention as claimed in claim 1, in which said tine is formed of steel and is so mounted that the tip of said tine is said part recited in clause (c).

8. A tine-type electromagnetic piano, which comprises:

a. a tine or reed formed of steel, said tine having a fixed end portion and a distal end portion, said distal end portion being free to vibrate in a predetermined direction, b. magnetic means including a protuberance to generate in the air in the region of said protuberance a steady- state magnetic field which is asymmetrical with respect to said protuberance, said means being such that the lines of force in said magnetic field loop back instead of following a substantially closed low reluctance magnetic circuit incorporating said tine or reed, said means causing said asymmetry of said magnetic field to be such that the magnetic field strength along a hypothetical straight line which extends through the air past said protuberance is relatively high adjacent one side of said protuberance and relatively low adjacent the other side thereof, c. means independent of said tine to mount said magnetic means in such relationship to said tine that said hypothetical line is parallel to said predetermined direction of tine vibration, and said distal end portion of said tine is disposed in said magnetic field adjacent said protuberance, d. piano action means to set said distal end portion of said tine into vibration in said predetermined direction, said piano action means, said mounting means and said tine being such that said distal end portion when vibrating at a normal amplitude will move from said one side of said protuberance to said other side thereof, and e. a coil of wire associated with said magnetic means in such manner that an electrical signal is generated in said coil in response to said vibration of said distal end portion.

9. The invention as claimed in claim 8, in which said protuberance has a peak portion, and in which said distal end portion of said tine, when at rest, is in a position generally opposed to said peak portion.

10. The invention as claimed in claim 9, in which said magnetic means comprises a permanent magnet and a low reluctance pole piece adjacent thereto, in which said coil of wire is mounted generally coaxially around said magnet, in which said peak portion of said protuberance is offset a substantial distance from the axis of said coil and of said magnet, and in which said tine is generally parallel to said axis.

11. The invention as claimed in claim 8, in which said protuberance has a peak portion, in which a second protuberance is incorporated in said magnetic means, said second protuberance being spaced from said peak portion of said first-mentioned protuberance in the direction of said hypothetical line, said first-mentioned and second protuberances cooperating with each other in maximizing said asymmetry of said magnetic field with respect to said first-mentioned protuberance.

12. In an electromagnetic piano of the type wherein a tine or reed having a relatively low reluctance is fixed at one end and is free at the other end to vibrate in a predetermined direction, wherein a piano action is provided to effect striking of said tine to set said other end into vibration, and wherein an electromagnetic pickup having a sensing coil is provided adjacent said other end to sense the resulting vibrations, the combination with said sensing coil of a magnetic means having a protuberance located adjacent the path of movement of said vibrating other end, said protuberance being such that the magnetic field strength at one side thereof is relatively high and the magnetic field strength at the other side thereof is relatively low, said one side and said other side being in line with said path of movement whereby said other tine end when vibrating with sufficient amplitude will be first in said high-strength field and then in said low-strength field, thus causing generation in said coil of an electrical signal characterized by desired higher harmonics without an excess of the second harmonic.

13. The invention as claimed in claim 12, in which the magnetic field adjacent said protuberance is characterized by a steep magnetic field-strength gradient which does not reverse from said one side to said other side.

14. The invention as claimed in claim 13, in which said protuberance is located adjacent said other tine end when the latter is at its rest position.

15. The invention as claimed in claim 12, in which said protuberance has a peak which is less than about one eight inch from said path of movement, measured along the shortest distance between said peak and said path.

16. The invention as claimed in claim 12, in which said protuberance has a peak, and said combination further comprises a second protuberance spaced from said peak of said first-mentioned protuberance in the direction of said path of movement.

17. The invention as claimed in claim 16, in which the depth of the region between said protuberance is at least about one eight inch.

18. The invention as claimed in claim 17, in which said protuberances have peaks which are spaced at least about one fifth inch from each other.

19. The invention as claimed in claim 12, in which said protuberance has a relatively sharp peak the shape of which is selected from a class consisting of (a) a substantial point, and (b) a short edge oriented transversely to said path of movement.

20. An electromagnetic musical instrument in the nature of a piano, which comprises:

a. a substantially cylindrical elongated steel tine, b. means combining with said tine to fixedly mount only one end thereof and to form an asymmetrical fork such that said tine will vibrate in a single predetermined plane and is substantially the fundamental mode only, c. means to set said tine into vibration in said plane, and d. electromagnetic pickup means mounted adjacent the free end portion of said tine to sense said fundamental-mode vibrations and to create an electrical signal characterized by the presence of the fundamental and of desired higher harmonics but without an excess of the second harmonic, said pickup means comprising a coil having an elongated permanent magnet mounted generally coaxially therein, said pickup means further comprising a low reluctance pole piece disposed adjacent said magnet and having a protuberance which is offset substantially from the common axis of said coil and magnet, said protuberance having a peak which is adjacent said tine when it is vibrating in said plane, said protuberance and said magnet being so constructed and related to each other that the magnetic flux emanates from said protuberance into the air and then loops back to the end of said magnet remote from said protuberance, said protuberance and said magnet also being so constructed and related that there is a steep unidirectional gradient of magnetic field strength at said protuberance.

the field strength a predetermined short distance on one side of said protuberance being high and the field strength the same predetermined short distance on the other side of said protuberance being low, said short distances being generally in said plane of vibration whereby said free end portion of said tine vibrates through regions of rapidly varying magnetic field strength, and e. amplifier and loudspeaker means connected to said coil to convert said signal into sound.

21. The invention as claimed in claim 20, in which said pole piece also has a second protuberance the axis of which is offset substantially from the common axis of said coil and magnet, the axes of said first-mentioned and second protuberances being on opposite sides of said common axis, the direction of offsetting of said axes of said protuberances from said common axis being generally in said plane of vibration and transverse to said tine.

22. An electromechanical musical instrument in the nature of a piano, which comprises:

a. a tine or reed which is fixed at one end, the other end portion of said tine being adapted to vibrate in a predetermined direction, b. a protuberance disposed generally opposite said other end portion, c. electromagnetic pickup means including said protuberance to generate at said other end portion a magnetic field such that vibration of said other end portion in said predetermined direction from one side of said protuberance to the other side thereof will generate in said pickup means an electrical signal characterized by the absence of an excessive second harmonic, said pickup means being such that said magnetic field has a steep field-strength gradient in said predetermined direction from a first point opposite said one side of said protuberance to a second point opposite said other side thereof, said first and second points being along the path of vibration of said other end portion, said field-strength gradient being unidirectional between said points, d. means to cause vibration of said other end portion in said predetermined direction, and e. amplifier and loudspeaker means to convert into sound the electrical signal generated in said pickup means.

23. The invention as claimed in claim 22, in which the rest position of said other end portion is between said points.

24. The invention as claimed in claim 23, in which said means recited in clause (c), and the characteristics of said tine, are such that said other end portion normally vibrates, when in steady-state vibration, from said one side of said protuberance to said other side thereof.

25. An electromechanical piano, comprising:

a. a low reluctance tine or reed which is fixed at one end and adapted at the other end to vibrate in a predetermined direction, b. electromagnetic pickup means to generate an electrical signal in response to said vibration in said predetermined direction, said pickup means including means to generate two magnetic field regions along a straight line which (1) is parallel to said predetermined direction, and (2) is near said other end of said tine, each of said magnetic field regions being such that a graph of field strength versus distance along said line is convex, one slope of such graph of one of said magnetic field regions being relatively adjacent one slope of such graph of the other of said magnetic field regions, at least the first of said two relatively adjacent slopes being steep, c. means to set said other end into vibration in said predetermined direction, and d. means to so locate said pickup means relative to said tine that (1) the rest position of said other tine end is on said first slope, and (2) said other tine end when vibrating at its normal steady-state amplitude will spend little, if any, time on the second of said two relatively adjacent slopes.

26. The invention as claimed in claim 25, in which said normal steady-state amplitude is at least 1/64 inch.

27. An electromagnetic pickup for a tine-type electromechanical piano, which comprises:

a. a coil of wire, and b. means including at least one protuberance to create magnetic flux lines through said coil of wire, said protuberance being so shaped and so related to said coil that said flux lines emanate in large numbers from one side of said protuberance but only in small numbers from the other side thereof, said means and said protuberance being such that said lines after emanating from said protuberance loop back around said coil substantially independently at all but a small portion of the tine with which the pickup is adapted to be associated, said protuberance being adapted to be disposed adjacent said small tine portion in such relation thereto that when the tine is vibrating said small portion will vibrate back and forth between said one side of said protuberance, at a region where there are many of said flux lines, and said other side thereof at a region where there are small numbers of said flux lines, whereby there is induced in said coil a non-sinusoidal voltage wave having desirable harmonic characteristics.

28. The invention as claimed in claim 27, in which there are two of said protuberances, one on one side of the axis of said coil, the other on the opposite side of said axis, each of said protuberances having large numbers of flux lines emanating therefrom from the side thereof remote from said axis, and small numbers of flux lines emanating therefrom from the side thereof relatively adjacent said axis.

29. The invention as claimed in claim 27, in which said protuberance is a substantial point.

30. The invention as claimed in claim 27, in which said protuberance is a sharp edge.

31. A method of manufacturing an electromechanical piano or the like, which method comprises:

a. providing a protuberance, b. employing said protuberance to generate adjacent one side of said protuberance a relatively strong magnetic field region, c. causing the magnetic field region adjacent the other side of said protuberance to be relatively weak, d. providing a fixed-free tine or reed having a vibrating portion, e. providing means to effect vibrations of said tine in such relationship to said protuberance that said vibrating portion moves suddenly between said strong and weak magnetic field regions, and f. so positioning a coil relative to said protuberance that a voltage wave is generated in said coil in response to said vibrations through said field regions as recited in clause (e).

32. The invention as claimed in claim 31, in which said method further comprises causing the magnetic field-strength transition between said relatively strong magnetic field region and said relatively weak magnetic field region to be sharp and unidirectional.

33. The invention as claimed in claim 31, in which said method further comprises causing said protuberance to have a peak offset a substantial distance from the axis of said coil.

34. The invention as claimed in claim 31, in which said method further comprises causing the great majority of the magnetic field-strength lines adjacent said protuberance to loop through said coil without passing along the length of said tine.

35. A method of creating, by use of a fixed-free vibrating tine and an associated electromagnetic transducer which is connected to amplifier and loudspeaker means, a musical tone which has bright characteristics, is relatively simulative of a tone generated by an acoustic piano, and does not have an excessive second harmonic, which method comprises:

a. employing as said electromagnetic transducer one wherein the lines of magnetic flux emanate from a protuberance, and then loop back through the air and through a coil which is connected to said amplifier and loudspeaker means, and also wherein there is a much greater concentration of said flux adjacent one side of said protuberance than adjacent the opposite side thereof, and b. causing a low reluctance portion of said tine to vibrate adjacent said protuberance in such direction as to be first relatively near said one side and then relatively near said opposite side.

36. The invention as claimed in claim 35, in which said method further comprises causing the steady-state amplitude of said vibration recited in clause (b) to be sufficiently great that said low reluctance tine part is alternately on said one side and said other side of said protuberance.

37. The invention as claimed in claim 35, in which said method further comprises employing as said transducer one wherein there is a steep and unidirectional magnetic field-strength gradient along the path of vibration of said tine portion, said gradient continuing across said protuberance between said one side and said other side thereof.

38. The invention as claimed in claim 35, in which said method further comprises employing as said transducer one wherein there is a second protuberance spaced from said first-mentioned protuberance generally in the direction of vibration of said tine portion, said second protuberance also having magnetic flux lines emanating therefrom and looping back through said coil, and causing said vibration of said tine portion to be substantially entirely in the vicinity of said first-mentioned protuberance and not said second protuberance.

39. The invention as claimed in claim 35, in which said method further comprises employing as said transducer one wherein said protuberance is offset a substantial distance from the axis of said coil.

40. The invention as claimed in claim 39, in which said method further comprises causing said tine portion to pass less than one eighth inch from said protuberance.

41. The invention as claimed in claim 20, in which the end of said pole piece adjacent said tine has a generally cylindrical exterior surface.

42. The invention as claimed in claim 41, in which said pole piece end has a generally V-shaped groove formed transversely thereacross, whereby to form two protuberances offset on opposite sides of said common axis, the width of said groove being sufficient that said peak of said protuberance adjacent said tine has a relatively small dimension in the direction of vibration of said tine.

43. The invention as claimed in claim 42, in which said peak of said protuberance adjacent said tine has a substantial dimension in a direction transverse to said plane of tine vibration.

* * * * *